(12) United States Patent
Lepre

(10) Patent No.: US 8,490,990 B2
(45) Date of Patent: Jul. 23, 2013

(54) TWIST-AXLE WITH LONGITUDINALLY-VARYING WALL THICKNESS

(75) Inventor: Stefano Lepre, Niederanven (LU)

(73) Assignee: Arcelormittal Tubular Products Canada Inc. (CA)

( * ) Notice: Subject to any disclaimer, the term of this patent is extended or adjusted under 35 U.S.C. 154(b) by 74 days.

(21) Appl. No.: 13/124,509

(22) PCT Filed: Oct. 15, 2009

(86) PCT No.: PCT/CA2009/001456
§ 371 (c)(1),
(2), (4) Date: Apr. 15, 2011

(87) PCT Pub. No.: WO2010/043036
PCT Pub. Date: Apr. 22, 2010

(65) Prior Publication Data
US 2011/0260423 A1    Oct. 27, 2011

Related U.S. Application Data

(60) Provisional application No. 61/106,389, filed on Oct. 17, 2008.

(51) Int. Cl.
*B60G 9/02* (2006.01)
*B60G 21/05* (2006.01)

(52) U.S. Cl.
USPC ............. 280/124.116; 280/124.128; 267/273; 267/188; 301/127

(58) Field of Classification Search
USPC ................... 280/124.106, 124.116, 124.128, 280/124.11; 267/273, 188; 301/124.1, 127
See application file for complete search history.

(56) References Cited

U.S. PATENT DOCUMENTS

| | | | |
|---|---|---|---|
| 5,800,024 | A | 9/1998 | Bungarten |
| 6,099,084 | A | 8/2000 | Bungarten |
| 6,487,886 | B2 | 12/2002 | Ueno |
| 6,523,841 | B2 | 2/2003 | Glaser |
| 6,543,857 | B1 | 4/2003 | Griffiths |
| 6,616,157 | B2 | 9/2003 | Christophliemke |
| 6,758,921 | B1 | 7/2004 | Streubel |
| 8,205,898 | B2 * | 6/2012 | Toepker ................ 280/124.106 |

(Continued)

FOREIGN PATENT DOCUMENTS

| | | |
|---|---|---|
| CA | 2522109 A1 | 4/2006 |
| EP | 0681932 | 11/1995 |
| WO | 02081115 A1 | 10/2002 |
| WO | 2006096980 A1 | 9/2006 |

*Primary Examiner* — Drew Brown
(74) *Attorney, Agent, or Firm* — Steven M. Greenberg, Esq.; Carey Rodriguez Greenberg O'Keefe, LLP

(57) ABSTRACT

The invention relates to a twist-axle that includes a cross-beam member and two trailing arms, each trailing arm rigidly secured to the cross-beam member in one of two connection regions of the cross-beam member or formed integrally with and extending from one of the two connection regions. The cross-beam member is formed from a tubular blank and has a torsionally elastic central portion and two torsionally stiff connection regions. The cross-beam member has a wall thickness that varies longitudinally along the length of the cross-beam member from the torsionally elastic central portion to each of the torsionally stiff connection regions.

28 Claims, 11 Drawing Sheets

U.S. PATENT DOCUMENTS

| | | | |
|---|---|---|---|
| 8,220,810 B2 * | 7/2012 | Jakob | 280/124.128 |
| 2006/0201227 A1 * | 9/2006 | Lepre et al. | 72/370.14 |
| 2007/0075518 A1 * | 4/2007 | Murata | 280/124.166 |
| 2010/0187788 A1 * | 7/2010 | Choi et al. | 280/124.106 |
| 2011/0031712 A1 * | 2/2011 | Bitz et al. | 280/124.106 |
| 2011/0115183 A1 * | 5/2011 | Alesso et al. | 280/124.106 |

* cited by examiner

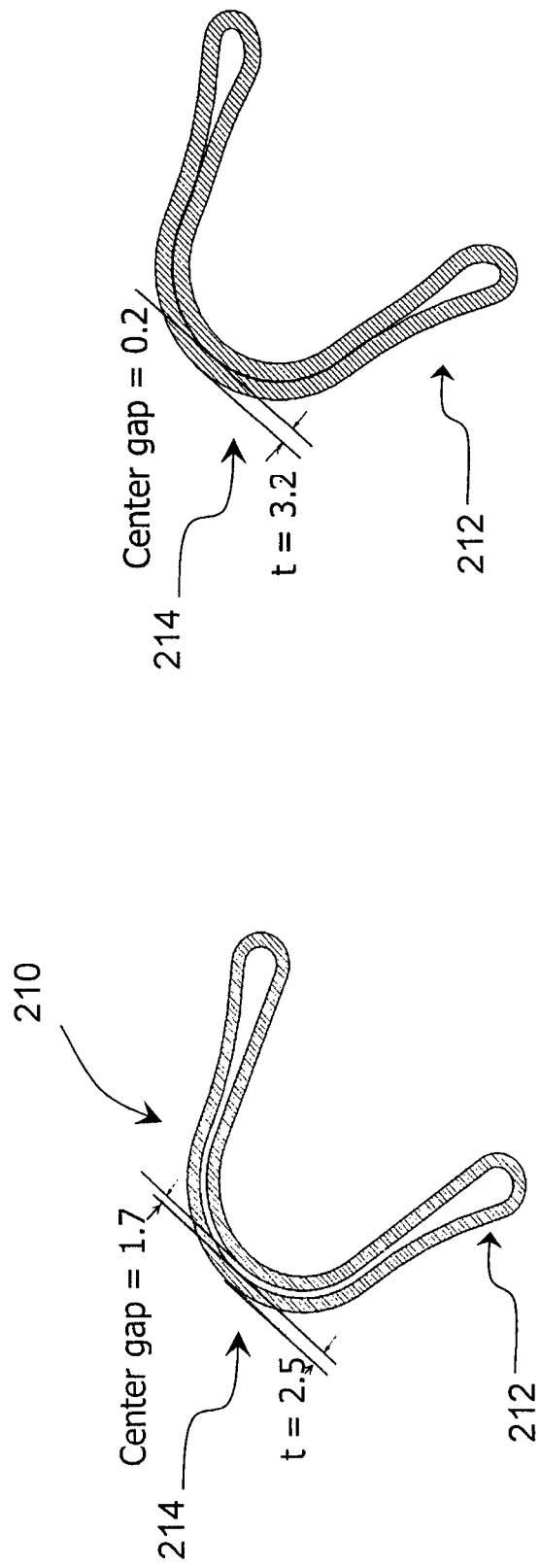

TWIST-AXLE WITH LONGITUDINALLY-VARYING WALL THICKNESS

CROSS-REFERENCE TO RELATED APPLICATIONS

This application is a Submission Under 35 U.S.C. §371 for U.S. National Stage Patent Application of International Application Number PCT/CA2009/001456, filed Oct. 15, 2009, and entitled TWIST-AXLE WITH LONGITUDINALLY-VARYING WALL THICKNESS which is related to and claims priority to United States Provisional Patent Application Ser. No. 61/106,389, filed Oct. 17, 2008, the entirety of both are incorporated herein by reference, and to Canadian Patent Application Serial Number 2,644,464, filed on Nov. 28, 2008, the entirety of both are incorporated herein by reference.

FIELD OF INVENTION

The invention relates generally to the field of tubular components for suspension and chassis structures, and has particular application to tubular twist-axle of a vehicle.

BACKGROUND OF INVENTION

In a vehicle, a twist-beam or twist-axle is often used as a rear suspension structure. A twist-axle has two trailing arms for connecting road wheels to a vehicle's frame and a cross-beam member linking the trailing arms to form an integral body. Each trailing arm is pivotally connected to a vehicle's frame. When the road wheels are unequally displaced relative to the vehicle's frame, such as when the wheels encounter an uneven surface or when the vehicle is turning, the unequal displacement causes the trailing arms to pivot by different amounts, thereby resulting in twisting of the cross-beam member. The inherent torsional stiffness or resistance of the cross-beam member provides a restoring force to the unevenly displaced wheels.

For ride comfort and controllability (i.e., handling) of the vehicle, twist-axles generally need to meet compliance requirements for torsional stiffness. By compliance of torsional stiffness, it is meant that a twist-axle needs to have a torsional stiffness within a specified range. On the other hand, a twist-axle is a load bearing component and must be designed to have sufficient strength to support linear loads, such as static weight of a vehicle and dynamic load created as the vehicle moves.

There have been many proposals to make twist-axles that meet both torsional or roll stiffness and load bearing requirements. For example, there have been proposals to make twist-axles incorporating a separate torsion bar. The torsion bar in this design provides the required torsional stiffness or resistance. In some designs, such as those described in International Publication No. WO 2006/096980, a torsion element welded to a cross-beam member replaces the torsion bar to provide the required torsional resistance. Separate parts allow separate design requirements to be met. These proposals, however, require additional manufacturing and material costs. There have also been proposals to manufacture cross-beam members from a tubular blank, such as those described in U.S. Pat. Nos. 6,616,157 and 6,487,886. Such a cross-beam member has a mid-section of low torsional stiffness between two transition sections of high torsional stiffness, to achieve the overall torsional stiffness requirement. The mid-section has a U-shaped, V-shaped, or star-shaped double-walled cross-sectional profile of low torsional stiffness. However, as a twisting force is applied to such a cross-beam member, stresses tend to concentrate in the transition zones located between the mid-section and the end sections, which may cause durability concerns. Proposals have been made, such as that taught in U.S. Pat. No. 6,758,921, to selectively heat treat the transition zones in order to impart desired physical properties to the transition zones to prevent cracking. This approach, however, introduces additional manufacturing steps and also requires additional heat treatment equipment.

It is an object of the present invention to mitigate or obviate at least one of the above mentioned disadvantages.

SUMMARY OF INVENTION

The present invention is directed to a cross-beam member for use in a twist-axle and a method of making the cross-beam member. A broad aspect of the present invention involves a cross-beam member of variable wall thickness, wherein the wall thickness varies along the length of the cross-beam member to meet anticipated local stress requirements and overall torsional stiffness requirements.

In one embodiment, the cross-beam member has two connection regions and a central mid-section between the two connection regions. The central portion is torsionally elastic and the connection regions are torsionally stiff. The connection regions are where the trailing arms are rigidly secured or linked to the cross-beam member. The tubular cross-beam member has a wall thickness varying longitudinally from the torsionally elastic central portion to each of the torsionally stiff connection regions. In one feature of the invention, the wall thickness is larger in at least a portion of the connection regions than in the central section. In another feature of the invention, the wall thickness varies smoothly along the cross-beam member from the torsionally elastic central portion to each of the torsionally stiff connection regions.

In another embodiment, there is a twist-axle that has a cross-beam member with a variable wall thickness. The cross-beam member is a unitary piece and is formed from a tubular blank. The cross-beam member has a torsionally elastic central portion and two torsionally stiff connection regions. The wall thickness of the cross-beam member varies longitudinally along the length of the cross-beam member from the torsionally elastic central portion to each of the torsionally stiff connection regions. In one feature of this embodiment, the cross-beam member has a general U-shape and comprises two trailing arms each integrally formed with and extending from one of the connection regions in a direction transverse to the direction defined by the central section. The terminal end of each trailing arm is adapted for a wheel to be attached thereto. In another feature of this embodiment, the twist-axle has two trailing arms secured rigidly to the opposite ends of the cross-beam member. One end of the trailing arm is adapted for connecting to the frame of a vehicle and the other end of the trailing arm is adapted for a wheel to be connected thereto.

In other aspects, the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which:

FIG. 3 is a cross-sectional view of the cross-beam member of FIG. 2 taken along line 3-3.

FIG. 4 is a cross-sectional view of the cross-beam member of FIG. 2 taken along line 4-4;

DETAILED DESCRIPTION OF EMBODIMENTS

Figure 1:
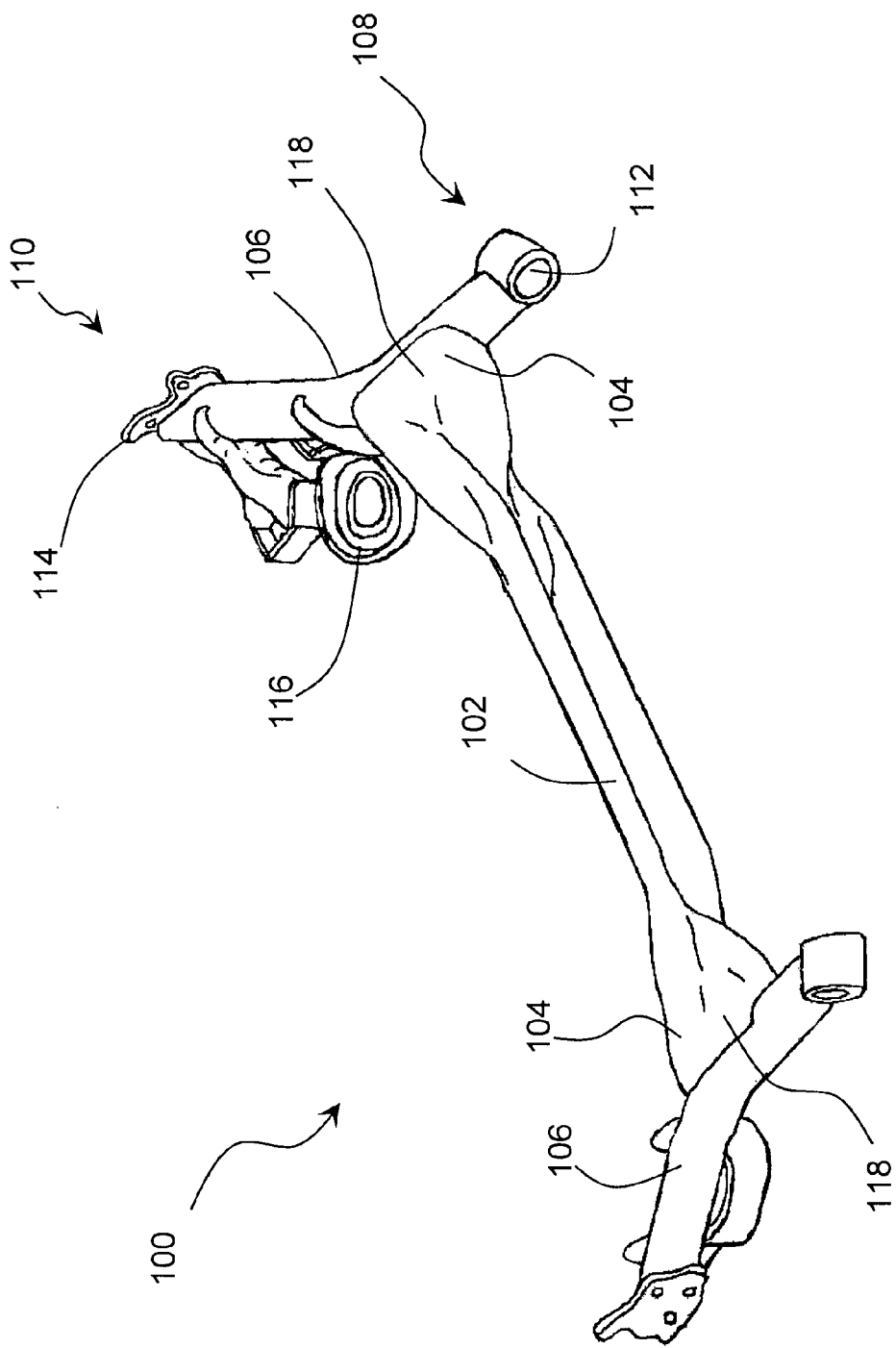
FIG. 1 is a perspective view of a twist-axle that includes a cross-beam member according to an embodiment of the present invention.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

FIG. 1 illustrates a twist-axle 100 in a suspension structure, in particular, a rear suspension structure. The twist-axle 100 includes a cross-beam member 102. The cross-beam member is generally elongated, having two opposite ends 104. The twist-axle 100 is typically provided with two side trailing arms 106.

Each trailing arm 106 has a first end 108 and a second end 110 as illustrated in FIG. 1. The first end 108 is adapted to be pivotally connected to a vehicle's frame (not shown) through, for example, connection fitting 112. Each of the trailing arms 106 has a wheel mount 114 secured thereto adjacent the second end 110 for supporting a road wheel (not shown). Spring seat 116, or other support structure for supporting suspension components or other attachments, may also be secured to the trailing arm 106, and/or to the cross-beam member 102. Each of the trailing arms 106 is rigidly secured to the cross-beam member 102 by welding, bolting, or any other suitable means. The region connecting the trailing arm to the cross-beam member 102 is a connection region 118, and in this case, is at an end 104 of the cross-beam member 102.

When a vehicle moves along an uneven road surface, its wheels tend to move up and down following the road surface. When the wheels on different sides of the vehicle move up and down by different amounts relative to the vehicle's body, the unequal vertical displacements of the wheels cause the two trailing arms 106 to pivot by different angular amounts. As each end 104 of the cross-beam member 102 is attached to a trailing arm 106, the pivoting of the trailing arms 106 by different amounts at the opposite ends of the cross-beam member 102 results in turning the opposite ends by different amounts, therefore a twisting of the cross-beam member 102. In response to the twisting, the cross-beam member provides a restoring force due to its inherent torsional stiffness. Similarly, when a vehicle turns, a centrifugal force acting on the center of gravity of sprung mass of the vehicle causes a shift of weight from one side of the vehicle to the other side and therefore from one wheel to the other, which also results in unequal pivoting of trailing arms due to torsional resistance of the cross-beam member. It is desirable that the cross-beam member is sufficiently torsionally stiff but not too torsionally stiff to provide good ride comfort and good tire contact with the road, therefore good controllability.

FIGS. 2-6 illustrate an example of a cross-beam member 102 in isolation and its transverse cross-sectional shapes at several selected locations. As noted, the cross-beam member 102 is generally elongated, having two opposite ends 104, which define a longitudinal direction. The cross-beam member 102 has a central portion, i.e., mid-section 202, and two end portions. Each end portion includes an end section 204 formed at one of the opposite ends 104 and a transition section 206 formed between the end section 204 and the mid-section 202. The mid-section 202 is torsionally elastic, which provides the required torsional resistance. The end sections 204 in this embodiment are the connection regions 118 and are torsionally stiff. The transition sections 206 provides a transition from the torsionally elastic mid-section to the torsionally stiff end sections. As will be discussed below, the cross-beam member 102 is preferably formed from a tubular blank whereby the mid-section 202, the transition sections 206 and the end sections 204 comprise a unitary body. The end sections 204 are preferably adapted to be attached to side trailing arms 106.

The transverse cross-sectional shape of the cross-beam member 102, i.e., the cross-sectional shape in a cross-section transverse to the longitudinal direction, varies along the length of the cross-sectional member. The transverse cross-section of mid-section 202 has a generally open profile, i.e., a profile that has at least two legs, the legs being joined or at least connected at one end and extending generally transverse of the longitudinal direction so that the other ends are spaced from each other to form the open profile. Some examples of such a generally open profile include a U-profile, a V-profile, a C-profile, an X-profile or a general, star-shaped profile. Such a generally open profile allows the mid-section 202 to be torsionally elastic, as the twisting and bending of legs along a longitudinal direction caused by a torque applied to the cross-beam member allow an elastic shape change of the legs and subsequent spring back when the torque is removed. The torsional elasticity or stiffness of such a mid-section may be adjusted, for example by adjusting the length of the mid-section having the generally open transverse profile, the cross-sectional shape, or the wall thickness of the cross-beam member in the mid-section. Any other transverse cross-sectional profiles that are suitable for providing a torsionally elastic mid-section may also be selected.

The cross-sectional profile 210 of the cross-beam member illustrated in FIGS. 3 and 4 has a general U-shape. The U-shaped transverse cross-sectional profile 210 has two legs 212 and a central connection portion 214 joining the legs. The transverse cross-sectional profile in mid-section 202 has the form of a flattened loop. Such a profile may be obtained by flattening a portion of a tubular blank and further forming the flattened portion into a U-shape. This may be a two-step process, i.e., flattening and then shaping, or a combined one-step forming process.

Figure 6:
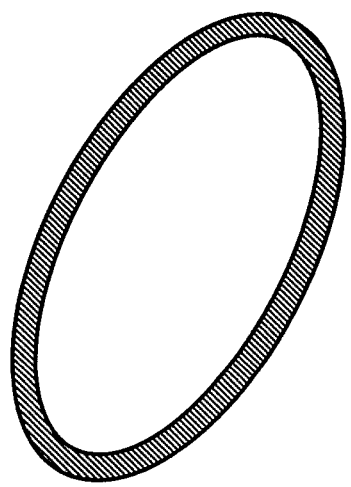
FIG. 6 is a cross-sectional view of the cross-beam member of FIG. 2 taken along line 6-6.
Figure 5:
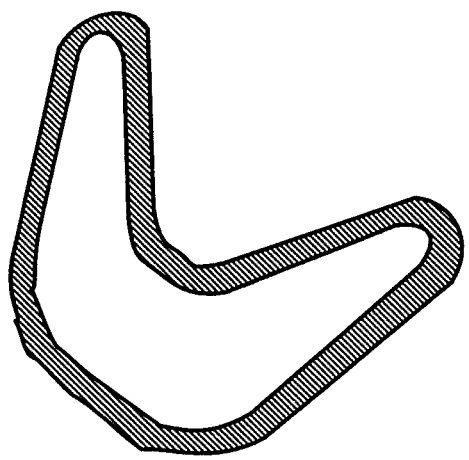
FIG. 5 is a cross-sectional view of the cross-beam member of FIG. 2 taken along line 5-5.

As can be seen in FIG. 6, the end section 204 has an end cross-sectional shape that may be circular, oval, or some other non-circular shape. Such a shape is suitable for attaching the end section to a side trailing arm. Such a transverse cross-sectional shape also provides a torsionally stiff end section, which as noted earlier, is a connection region. The transverse cross-sectional shape of the transition section 206 transitions from that of the mid-section 202 to that of the end section 204. An example is shown in FIG. 5. Preferably, such transition is smooth and gradual. When the cross-beam member is twisted by opposite torsional forces exerted on opposite ends 104, the transition sections transmit the torsional forces to the mid-section. Smooth transition helps avoiding any concentrated build-up of stress in the transition section when the mid-section is twisted by the twisting forces exerted at the end sections and transmitted through the transition sections.

The cross-sectional shape in the transition section transitions from a cross-sectional shape in the mid-section, for example, a U-shape or a V-shape, to an end cross-sectional shape in the end section, such as an oval shape. Because the transition sections are partially pressed inwardly transverse to the longitudinal direction, the shape change in the transition sections also imparts some torsional elasticity to the transition sections. The transition section is more torsionally elastic near the mid-section than near the end section, due to the change in its cross-sectional shape. The cross-sectional shape of the transition section and the longitudinal variation of the cross-sectional shape may be that determined by forming process, for example, by holding the end sections fixed while pressing and forming the mid-section, or may be that determined by a forming die designed for the transition region, which may provide more precise control of the torsional elasticity and its variation in the transition region. As will also be appreciated, the wall thickness and its longitudinal variation in the transition section will also affect the torsional elasticity and its variation.

Figure 2:
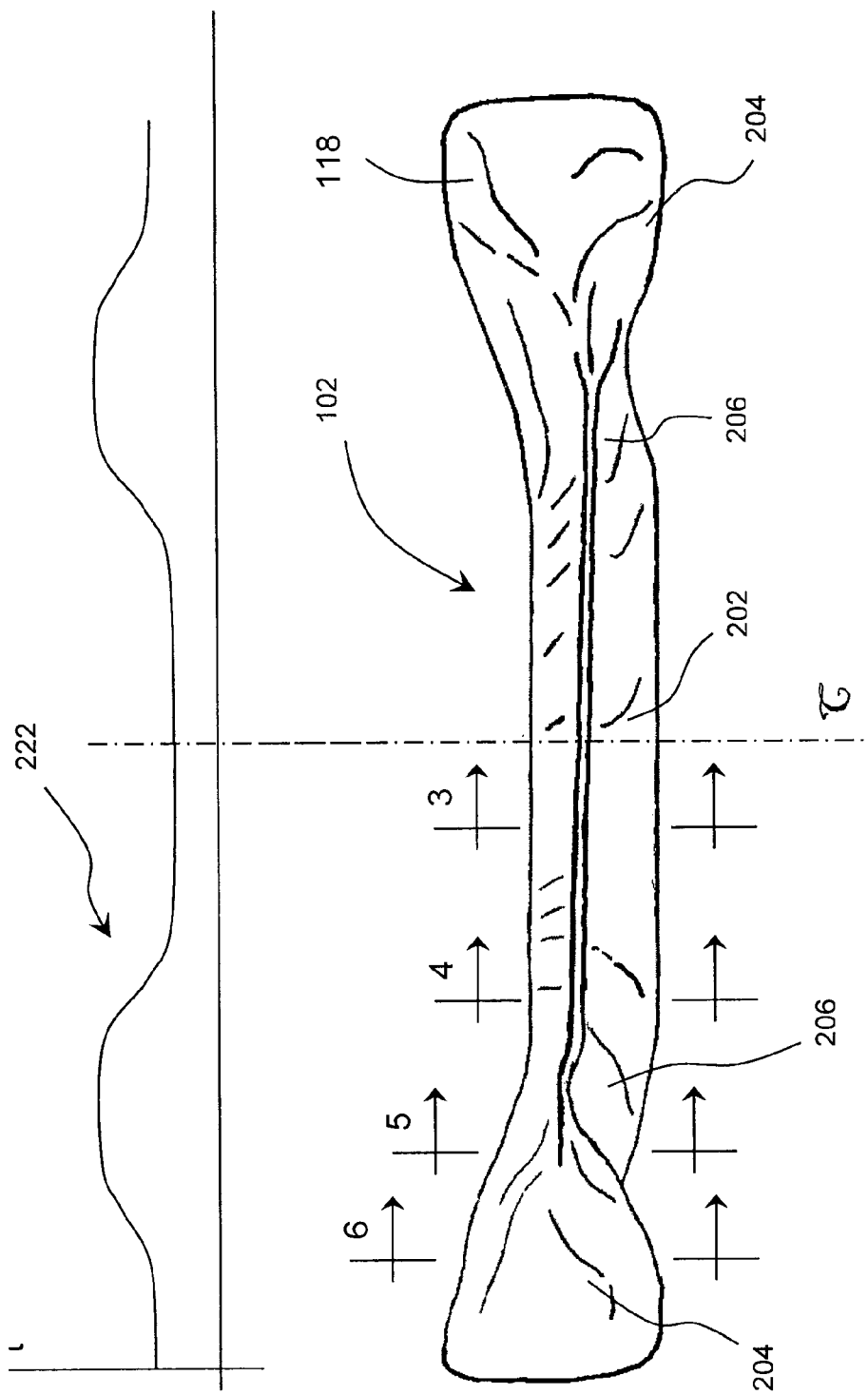
FIG. 2 shows in a perspective view a cross-beam member used in the twist-axle shown in FIG. 1.

Referring to FIG. 2, cross-beam member 102 of the invention is preferably provided with a varying wall thickness t along its length, as shown in a representative longitudinal profile 222 in FIG. 2. The example of cross-beam member 102 has a wall thickness that is generally uniform circumferentially as can be seen in FIGS. 3 to 6 and varies longitudinally along the cross-beam member as can be seen in FIG. 2. Typically, the longitudinal profile 222 is generally symmetrical. That is, the wall thickness of the cross-beam member varies equally when moving from the center of the cross-beam member to either end. However, non-symmetrical longitudinal profiles are also contemplated, for example, when required to accommodate any non-symmetrical shapes or load conditions.

FIG. 2 illustrates an example of longitudinal variation of wall thickness, i.e., the variation of wall thickness longitudinally along the length of a cross-member beam 102. The mid-section 202 illustrated in FIG. 2 has the thinnest wall, i.e., the thickness is the smallest. A larger wall thickness of the cross-beam member occurs in the transition section 206. In a preferred embodiment, the wall thickness t transitions smoothly from one section to the next, as illustrated in the overall longitudinal profile 222. Similar to smooth transitioning of transverse cross-sectional profile in the transition section, smooth transitioning of wall thickness from one wall thickness to the next, or from that of one section to the other, also helps avoiding concentrated build-up of local stress, in particular, in any regions of non-smooth transition.

As described earlier, the cross-beam member must meet compliance requirements of torsional stiffness. A cross-beam member is also a load bearing component and must also have the required strength, to carry the stress levels generated by torsional, bending, shear, and axial loads. As noted, the transition sections transmit torsional forces exerted on opposite ends to the mid-section. The transition in cross-sectional shape may cause stress concentration in the transition sections when the cross-beam member is twisted. Durability tends to be affected by any potential cracks in regions of high stress in the transition sections caused by frequent twisting, which is another concern. As can be appreciated, larger thickness allows to reduce stresses in any given structure, but it also proportionally increases stiffness. Instead of selecting a constant wall thickness for the cross-beam member that will be a compromise between the low stiffness and the maximum allowable stress requirements, the wall thickness and its variation along the length of the cross-beam member are "tuned". In other words, the wall thickness and its longitudinal variation are adjusted according to design requirements such as the overall load bearing and torsional stiffness requirements, and anticipated local stress concentration. The variation of wall thickness is selected to support local stress concentration. For example, the wall thickness is larger in regions where larger stress concentration is expected and smaller where such larger stress concentration is not expected. The wall thickness can also be reduced where a region is required to be more compliant. Variation of wall thickness also may be selected to minimize local stress concentration, which results in a more evenly distributed local stress. Evenly distributed local stress, especially when under severe load conditions, helps extending service life of the component, as less stress concentration leads to less early failures in these high stress regions.

As will be appreciated, any one of the mid-section, the transition sections and the end sections of a cross-beam member can be "tuned" and is often tuned in order to optimize the distribution of mass along the length of the cross-beam member, while meeting the design requirements, such as local stress distribution, overall torsional stiffness compliance, etc. For example, when required by load bearing requirements, the mid-section may have a wall thickness larger than that in the transition sections, in the end sections or in both sections, or the mid-section may have a wall thickness about the same as in one of the other sections. Similarly, the other sections may also have larger or smaller wall thickness as required. Any two of the sections, for example, the end sections and the transition sections, also may have the same wall thickness. In addition, dividing the cross-beam member into a mid-section, two transition sections and two end sections and treating each section to have a generally uniform wall thickness are only for convenience of description. Any of these sections can be divided into subsections which may have a variable wall thickness within the section, if desirable or necessary.

In general, the wall thickness of the cross-beam member is varied longitudinally as required. For example, each section may itself have a variable wall thickness. The variation of wall thickness of each sections and within each section is tuned, i.e., adjusted, according to anticipated local stress, subject to additional factors such as overall requirements of torsional stiffness, load bearing requirements, material selected, overall sizes of the cross-beam member and length of each sections, durability requirements, among others. The longitudinal profile shown in FIG. 2 is only one example. It will also be appreciated that cross-beam member 102 may have other shapes, not limited to that shown in FIG. 2. Changing the shape of the cross-beam member may also lead to different local stress distribution and overall torsional stiffness and load bearing abilities, which may also lead to a different longitudinal variation of wall thickness.

Figure 7A:
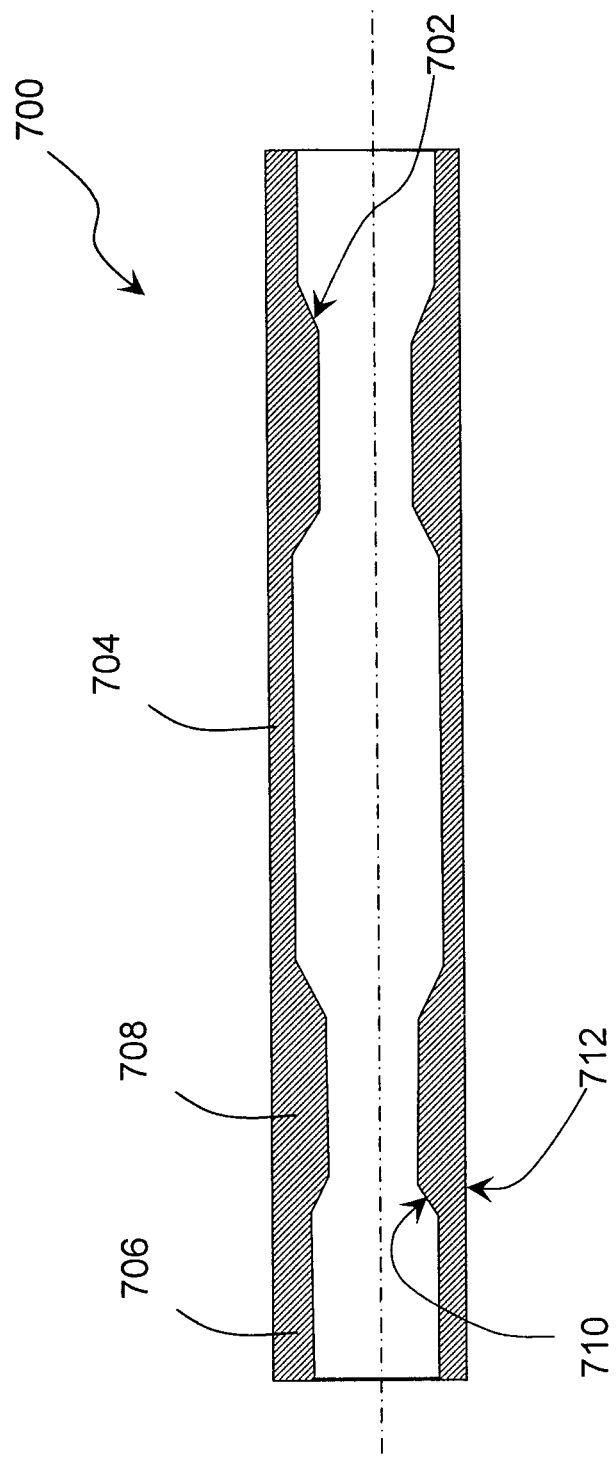
FIG. 7A illustrates in longitudinal cross-sectional view a tubular blank for making a cross-beam member shown in FIG. 2.
Figure 7B:
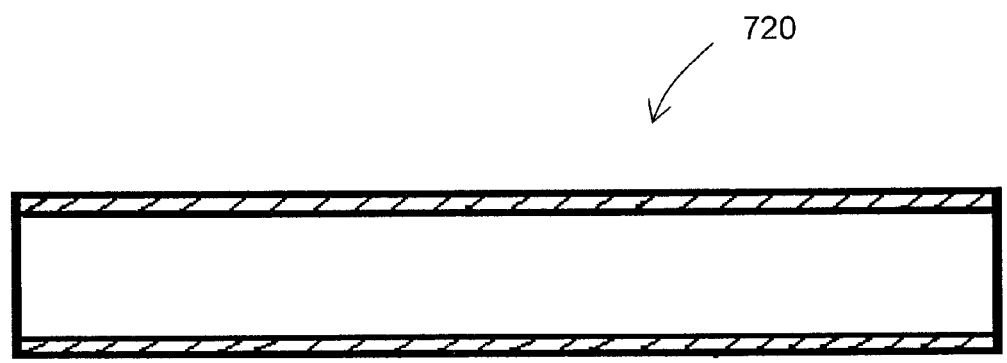
FIG. 7B illustrates an initial tubular blank of constant wall thickness that can be used to form the tubular blank shown in FIG. 7A.

A cross-beam member having variable wall thickness as shown in FIG. 2 may be formed from a tubular blank 700 having a variable inner diameter and a constant outer diameter as shown in FIG. 7, as will be described below. The tubular blank 700 itself that has variable wall thickness may be formed using any suitable technique, such as that described in PCT Application No. PCT/CA2002/00464, the entire content of which is incorporated herein by reference. Briefly, a tubular blank 700 having a uniform outer diameter and variable wall thickness is formed from an initial tube 720 of constant wall thickness (FIG. 7B) using a reciprocating mandrel and die assembly through a cold forming process. The die has a die cavity that has an opening corresponding to the outer diameter of the tubular blank 700. The mandrel has sections of different diameters or may be tapered. When cold forming the tubular blank, the mandrel is placed inside the tube and selectively moved into or out of the opening of the die, or with sections of different diameters selectively placed in the die opening. The die opening has a size smaller than the initial outer diameter of the initial tube. The initial tube 720 is drawn through the die opening. As the initial tube is forced through the die opening, the outer diameter of the formed tube is reduced to the size of the die opening. The wall of the tube passing through the die is constricted at desired locations by the mandrel and the die opening, thereby restricting the wall to a thickness defined by the gap between a section of the mandrel placed in the die opening and the die opening itself. If the mandrel is removed from the die opening, such constriction is not possible and the wall thickness is unaffected by the mandrel. By selectively moving the mandrel in and out of the die opening and selectively placing sections of the mandrel of different diameters in the die opening as the tube is drawn through the die opening, a tubular blank of varying wall thickness is obtained. After the tubular blank reaches the desired or designed length, the tube is cut or severed from the initial tube.

For example, when an initial tube 720 is first drawn through the die opening, the section of the mandrel placed in the die opening has a diameter such that the difference between the mandrel diameter and die opening's diameter is twice the wall thickness of the end section in order to form a end section with the desired wall thickness. After a desired length of the end section is formed, a different region of the mandrel is gradually moved into the die opening to form the transition section. The difference between of the mandrel diameter in this region and the die opening diameter is twice the wall thickness of the transition section. As the repositioning of the mandrel is gradual, the resulting change of wall thickness, namely the transition from that of the end section to that of the transition section, also tends to be smooth. After the desired length of the transition section is formed, another different region of the mandrel is gradually moved into the die opening. The difference between the die opening diameter and the mandrel diameter in this region is twice the wall thickness of the midsection. After the mid-section is formed, the mandrel is repositioned again to form the second transition section, after which, repositioned again to form the second end section. The tube is then cut to obtain a tubular blank that has a variable wall thickness corresponding to that of the cross-beam member.

When a tubular blank of varying wall thickness is cold formed this way from an initial tubular blank of uniform wall thickness, the cold forming process often introduces stress in deformed regions such that the cold-formed tubular blank may become too stiff or too brittle for further processing. Preferably, the cold-formed tubular blank is stress relieved prior to further forming of the tubular blank into a cross-beam member.

As will be appreciated, although a tubular blank 700 shown in FIG. 7A has a uniform outer diameter, using such a tubular blank is for convenience only. In particular, it is for the convenience of manufacturing tubular blanks using a die set of fixed die opening. Other types of die set and other forming techniques can be employed to produce tubular blank 700. Tubular blanks therefore may have variable wall thickness that is due to variation in inner diameters, due to variation in outer diameters or a combination of variations in inner and outer diameters. For example, the tubular blank shown in FIG. 7A has an internal tube diameter 710 that varies along the length of the tubular blank 700 and a constant outer diameter 712. The distance between the inner and outer diameters is the wall thickness. As the difference varies along the length of the tubular blank, the wall thickness varies accordingly. In the example shown in FIG. 7A, the variation in wall thickness of the tubular blank, and therefore the variation in wall thickness of the cross-beam member formed from the tubular blank, is due to variation in the inner diameter alone, with the outer diameter remaining generally constant. It is also possible to keep inner tube diameter 710 constant and vary the outer diameter 712 along the length of the tubular blank. The variation in wall thickness will then be due to the variation in the outer diameter alone. Of course, both inner and outer diameters may vary along the length of the tubular blank and can contribute to the variation of wall thickness along the tubular blank, and therefore the variation of wall thickness of the cross-beam member.

FIG. 7A shows an example of a tubular blank 700 that has a longitudinal profile of wall thickness 702 corresponding to that of the cross-beam member shown in FIG. 2. The tubular blank shown in FIG. 7A has two opposite end regions 706 corresponding to the end sections 204, two intermediate, transition regions 708 formed between the end regions 706 and a central region 704 formed between the transition regions 708. The transition regions 708 correspond to the transition section 206 and the central region 704 corresponds to the mid-section 202. Other than some possible small changes in wall thickness caused by a forming process described below, the wall thickness of the end regions is essentially the same as the wall thickness in the end sections 204 of the cross-beam member, the wall thickness in the transition regions 708 is essentially the same as the wall thickness in the transition sections 206 and the wall thickness in the central region 704 is essentially the same as the wall thickness in the mid-section of the cross-beam member. After such a tubular blank 700 is obtained, the tubular blank is deformed, e.g., press formed, to obtain a cross-beam member.

Figure 7C:
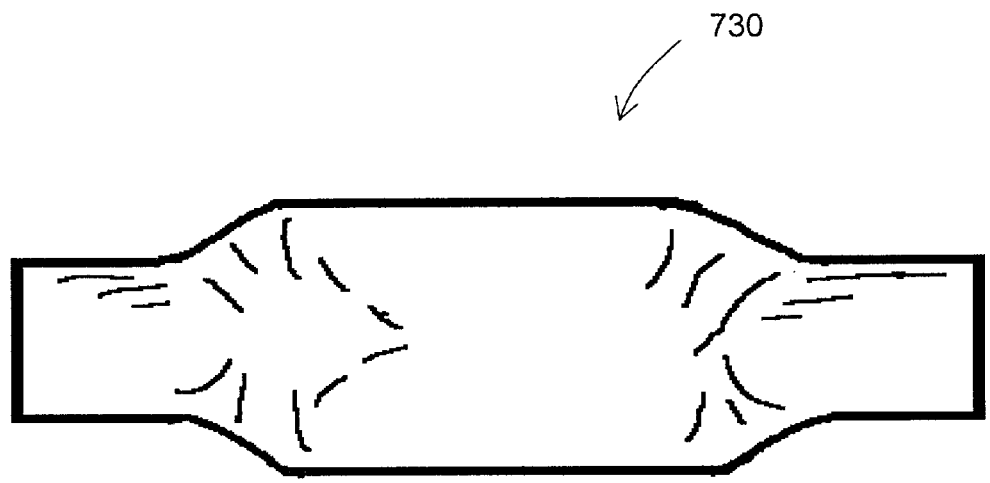
FIG. 7C illustrates a partially flattened tubular blank formed from the tubular blank shown in FIG. 7A.

To form a cross-beam member 102, the tubular blank 700 may be first flattened in a substantial portion in the middle and further deformed into the U-shaped cross-sectional profile in the central region 704. Forming the central region 704 into the U-shaped profile may be a two-step process, for example. In a two-step process, the first step is to flatten the central region, a substantial portion of the central region, or the central region and part of the neighboring transition regions, to obtain a partially flattened tubular blank 730, as illustrated in FIG. 7C. The flattened portion 732 of the partially flattened tubular blank 730 is next bent to form the U-shaped cross-sectional profile. Of course, these two steps, i.e., flattening and bending, can also be carried out in a combined one-step process. For example, the tubular blank 700 may be placed in a forming die which has a longitudinal U-shaped surface and then have a substantial portion of the tubular blank flattened and deformed at the same time to conform with the U-shaped surface of the forming die. As the central region 704 is deformed, e.g., shaped by a forming die or pressed and bent, the intermediate, transition region 708 are deformed by forces exerted by the central region 704 that is being deformed. The cross-sectional profile of the cross-beam member preferably transitions smoothly from one end section, through transition sections and the mid-section, to the other end section. A cross-beam member 102 having a longitudinal profile 222 of wall thickness and a cross-sectional profile that transitions from a general U-shape in the central region to a generally flattened oval shape near the ends can be formed from a tubular blank.

Figure 8A:
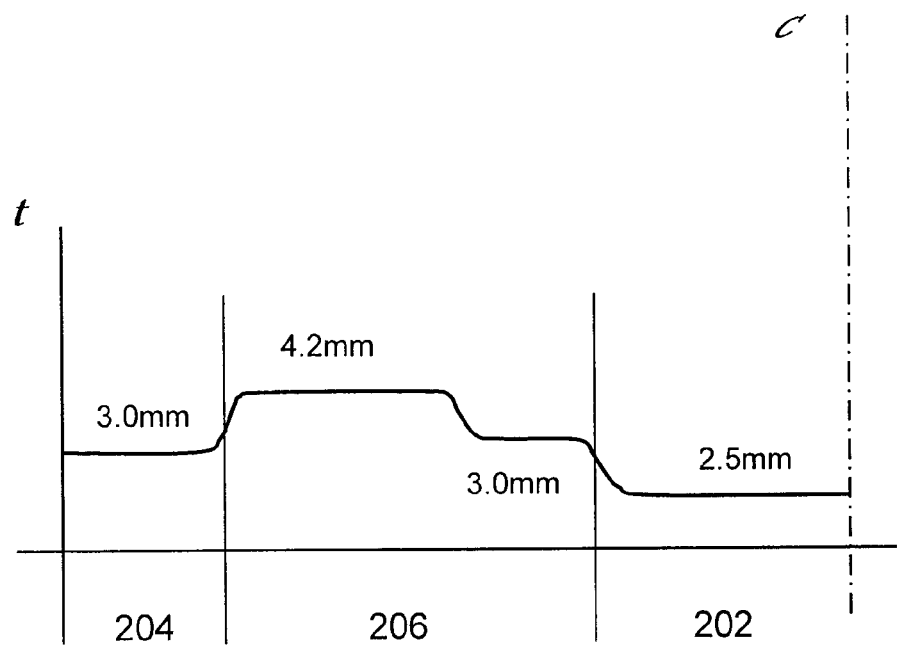
FIG. 8A shows an example of a longitudinal profile of wall thickness (only one half is shown; the other half is a mirror image thereof)
Figure 8B:
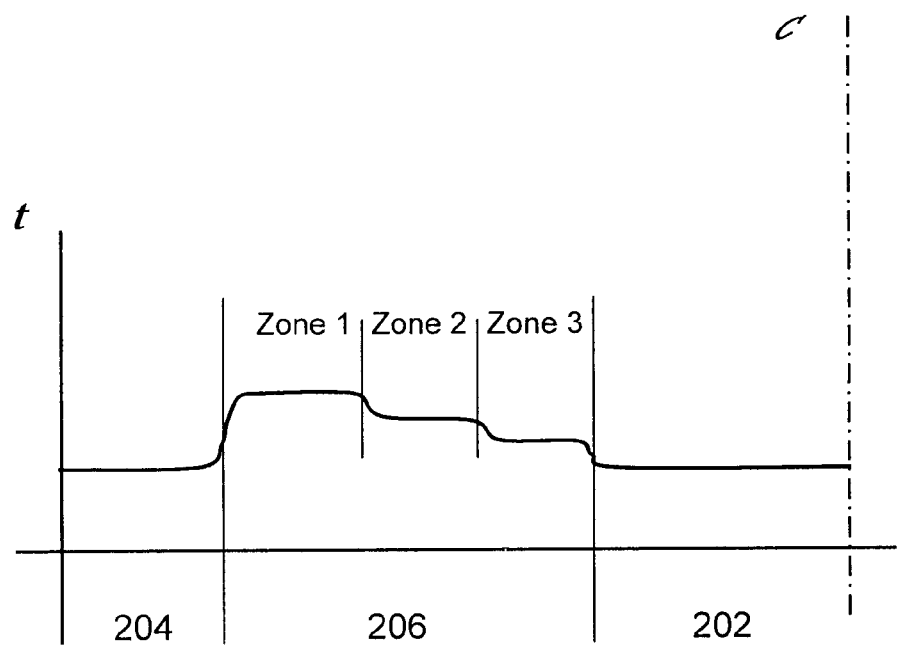
FIG. 8B shows another example of a longitudinal profile of wall thickness of the cross-beam member shown in FIG. 2 that has a transition section divided into three design zones (only one half is shown; the other half is a mirror image thereof)
Figure 8C:
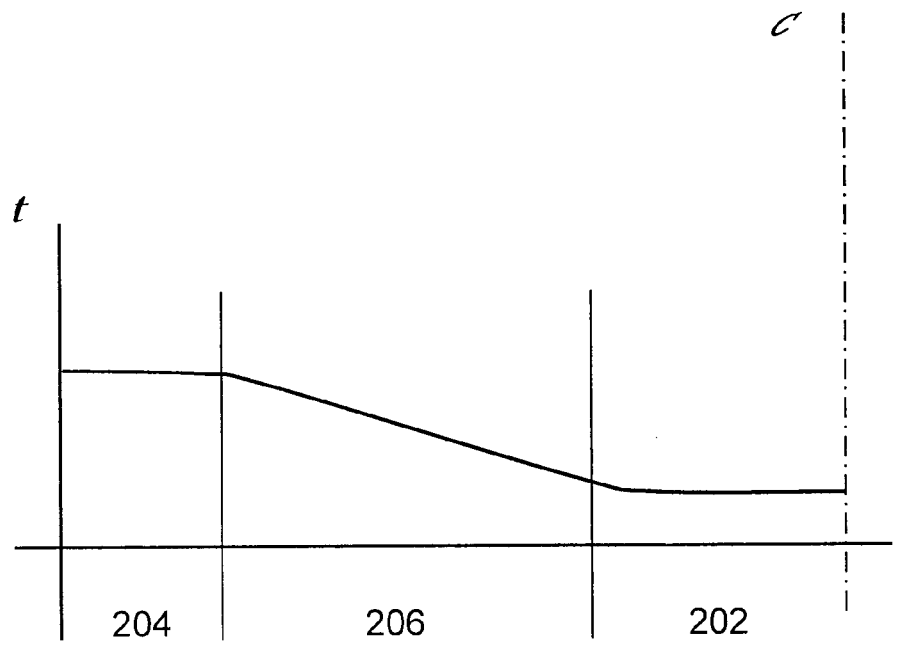
FIG. 8C shows yet another example of a longitudinal profile of wall thickness of the cross-beam member shown in FIG. 2 that has a transition section having a tapered wall thickness (only one half is shown; the other half is a mirror image thereof)
Figure 8D:
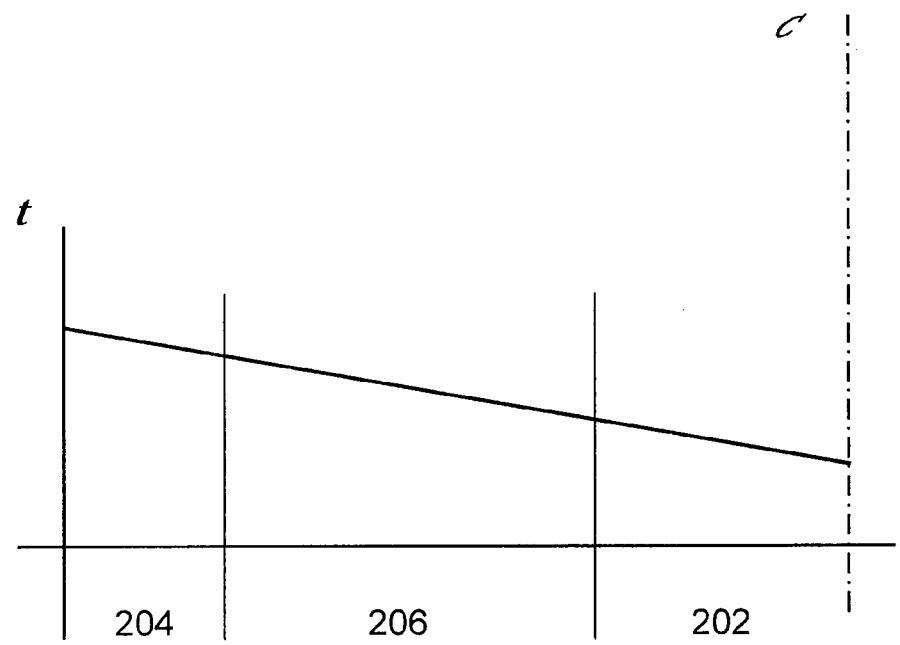
FIG. 8D shows a further example of a longitudinal profile of wall thickness with a tapered wall thickness along the entire half of a cross-beam member (only one half is shown; the other half is a mirror image thereof)

As noted, none of the end sections, transition sections and the mid-section in general need to have a constant wall thickness. Any of them may have regions of different wall thicknesses to meet the design requirements for these sections. FIG. 8A shows an example of a longitudinal profile representing a cross-beam member that has its transition section divided into two regions, the region adjacent the end section having a larger wall thickness while the wall thickness in the other region is smaller. FIG. 8B shows another example, in which the transition section 206 is divided into three zones, namely zone 1, zone 2 and zone 3, zone 1 being adjacent the end section 204 and zone 3 being adjacent the mid-section 202. Zone 2 is formed between zone 1 and zone 3. Each of these zones may be tuned, i.e., with its wall thickness adjusted according to design requirements, and are referred to as design zones. As one example, the wall thickness in zone 1 may be larger than that in zone 2, which may be larger than that in zone 3, which may be in turn larger than that in the mid-section. As another example, zone 3 may have the smallest wall thickness, with zone 2 having the largest wall thickness and the mid-section having a wall thickness between that of zone 2 and zone 3. Of course, different number of design zones in each section, other distributions of wall thicknesses in these design zones and their values in relation to wall thicknesses in the mid-section and the end sections are also possible, depending on specific design requirements and constraints for different specific vehicles. FIG. 8C illustrates another example of variation of wall thickness. The wall thickness of end section 204 is larger than the wall thickness of mid-section 202. The transition section 206 between the end section 204 and the mid-section 202 has a tapered wall thickness, i.e., the wall thickness in the transition section decreases continuously toward the mid-section. FIG. 8D provides yet another example in which the wall thickness decreases continuously toward the middle of the cross-beam member in all three sections, namely end section 204, transitions section 206 and mid-section 202.

Figure 9A:
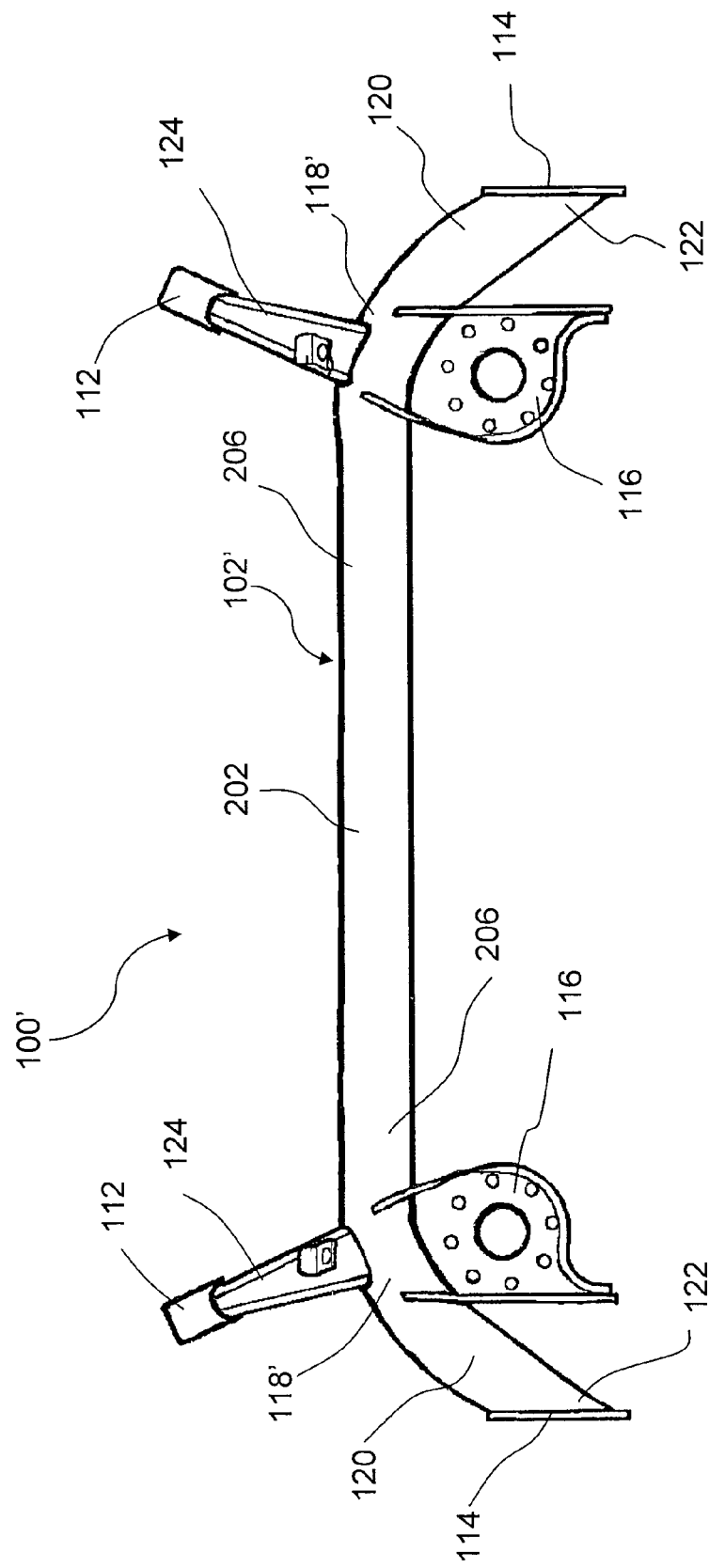
FIG. 9A is a top plan view of a cross-beam member as an example of an alternative embodiment to that shown in FIG. 2.

FIG. 9A illustrates an example of another embodiment of a twist-axle 100'. Instead of a generally straight cross-beam member, twist-axle 100' has a generally U-shaped cross-beam member 102'. The U-shaped cross-beam member 102' has a generally straight mid-section 202 and two transition sections 206, with two integrated trailing arms 120 forming the legs of the U. Each integrated trailing arm 120 extends from a connection region 118' of the U-shaped cross-beam member 102'. Each integrated trailing arm 120 has a terminal end 122, which is adapted for a wheel to be connected thereto, such as having a wheel mount 114 secured thereto. The U-shaped cross-beam member 102', including the mid-section 202, the transition sections 206, the connection regions 118', and the integrally formed trailing arms 120, is a unitary piece and is formed from one tubular blank, as will be described in detail below. The general shape and transverse cross-sectional profile of the mid-section 202, the transition sections 206, the connection regions 118' are substantially the same as that of the general straight cross-beam member 102 of twist-axle 100, other than the bends in the connection regions 118, and therefore will not be described in detail here.

The twist-axle 100' also has a pair of side arms 124, which correspond with the front portion of the trailing arms 106 of twist-axle 100 shown in FIG. 2. Each side arm 124 has one end adapted for securing to the connection region of the cross-beam member 102'. This may be, for example, by way of welding, bolting, or some other suitable means. In the example shown in FIG. 9A, side arm 124 is welded to spring seat 116 and to cross-beam member 102' in the connection region 118'. Each of the side arms 124 has its other end adapted to be connected to a vehicle's frame through, for example, connection fitting 112. The side arms 124 may be tubular or they can be stamped. They also can have either open or closed cross-sectional shapes.

The cross-beam member 102' has a variable wall thickness varying along the length. The variation of wall thickness provides a torsionally elastic central section and torsionally stiff connection regions. At least, a portion of each connection region 118' where integrally formed trailing arm 106 is formed is torsionally stiff. The wall thickness generally varies smoothly along the cross-beam member from one terminal end 122 to the other terminal end 122.

Figure 9B:
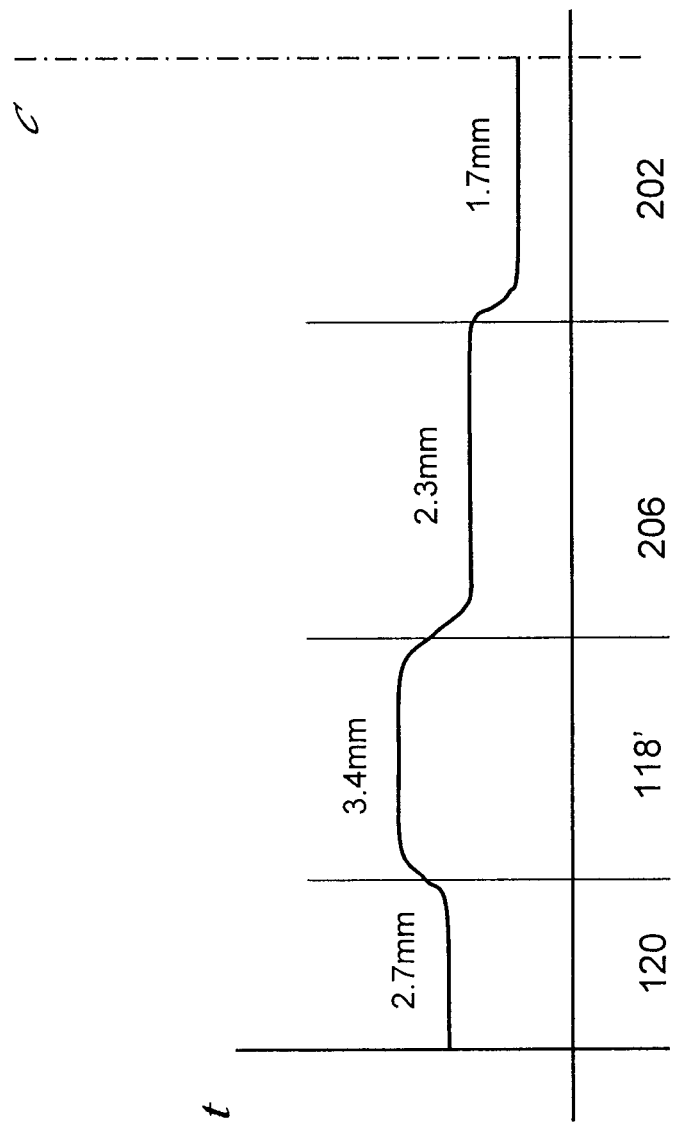
FIG. 9B illustrates an example of a longitudinal profile of wall thickness (only one half is shown; the other half is a mirror image thereof) of the cross-beam member shown in FIG. 9A.

FIG. 9B shows an exemplary longitudinal profile of wall thickness of cross-beam member 102' (only one half is shown, the other half is a mirror image thereof). The wall thickness is about 2.7 mm in the integrated trailing arm 120 section and then is increased to about 3.4 mm in the connection region 118'. The wall thickness is the smallest in the central section 202 in this example, about 1.7 mm. The example of the cross-beam member 102' shown in FIG. 9B also has a transition section 206 formed between each of the connection regions 118' and the central section 202. The transition section 206 in this example has a wall thickness between that of the connection region and that of the central section and is about 2.3 mm. Of course, it will be appreciated that the relative wall thicknesses and their values in different regions in this example are for illustration only and may be different depending on specific design requirements and constraints for different specific vehicles.

Figure 9C:
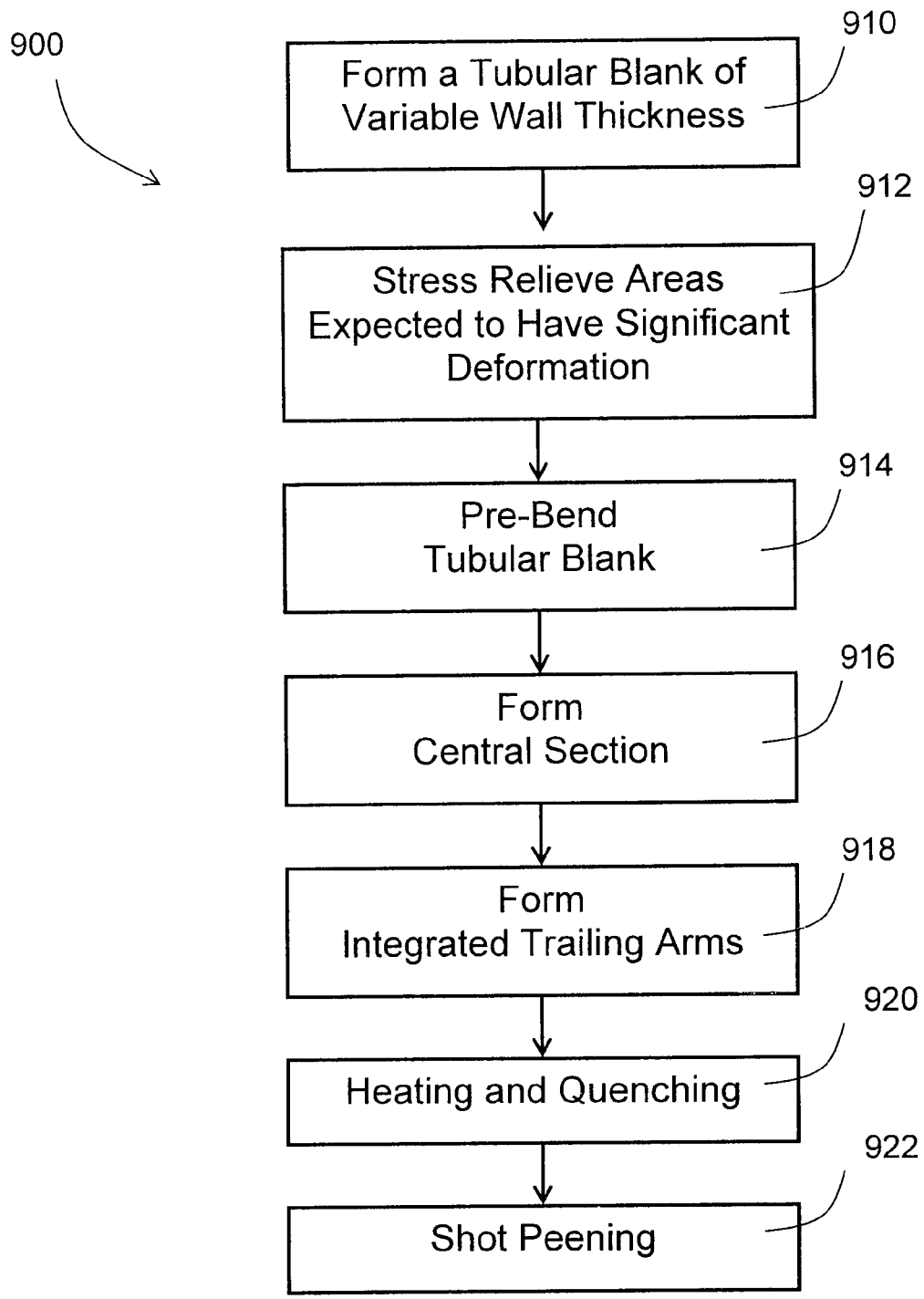
FIG. 9C shows steps of a process for producing a cross-beam member shown in FIG. 9A.

To form a cross-beam member 102', a series of steps typically will be required. FIG. 9C illustrates steps of a process, which also includes a number of optional steps, for forming a cross-beam member 102'. The process 900 starts with forming (step 910) a tubular blank 700 that has a variable wall thickness. The details of forming a tubular blank of variable wall thickness have been provided in connection with forming a cross-beam member 102 and will not be repeated here. The tubular blank 700 has a longitudinal profile of wall thickness corresponding to that of cross-beam member 102', one example of which is shown in FIG. 9B. The tubular blank 700 is next stress relieved (step 912) in regions where significant deformation is expected, such as regions corresponding to central section and connection regions of the cross-beam member. Next and optionally, in a pre-bend step 914, the stress relieved tubular blank is bent in the connection regions to shape the stress relieved tubular blank into a "U". The central section is next formed at step 916 to form the generally open transverse profile, in the manner described earlier in connection with forming a generally straight cross-beam member 102, which will not be repeated here. Next, at step 918, the integrated trailing arms 120 are formed. The integrated trailing arms 120 formed at this step may be further sized where necessary. Finally and optionally, heating and quenching may be applied (step 920) in areas where higher strength is required or desirable, such as in the connection regions or the transition regions and shot peening may be further applied (step 922) in these areas. Conveniently or preferably, heating and quenching may be applied to the entire cross-beam member 102'. Likewise, both shot peening partial or full surfaces are contemplated. Shot peening also can be applied on inner surface, outer surface or both inner and outer surfaces of the tubular cross-beam member 102'.

As noted, some of the steps described above are optional. For example, depending on specific applications or production requirements, heating and quenching (step 920) and the immediately followed shot peening step 922 may not be necessary. In addition, as will be appreciated, some of the steps may not necessarily follow the order illustrated and described. For example, heating and quenching (step 920) and the subsequent shot peening step 922 may also be carried out prior to the pre-bending step (step 914), again, depending on design requirements.

It will be appreciated that wall thickness, for any given load requirement and torsional stiffness requirement, is affected by material selected. One material suitable for making cross-beam members is an HSLA steel, such as an HSLA80F steel (YS 80 ksi, UTS 95 ksi, 20% Uniform Elongation). An HSLA steel is generally preferred as it provides required high strength for some typical applications, without requiring subsequent quench and temper operations after the cross-beam member is formed. Although HSLA steel is preferred, other materials may be used. For example, while heat treatment is preferably to be avoided, it is also contemplated that, in order to reduce weight further or to meet particularly low values of stiffness, other materials having even higher strength but requiring heat treatment may be used. One such material is boron steel. Boron steel, because of its considerably higher strength, can more easily meet the load requirements than HSLA steel but with less weight or with lower stiffness of the axle. A cross-beam member may be made from a boron steel, such as Mn22B5 steel. However, heat treatment of the transition sections generally will be required in order to harden the heat treated regions to achieve desired yield point. The transition sections can be heat treated before or after the mid-section is formed into the U-shaped cross-sectional profile. Heat treatment is also contemplated where higher strength is required in certain special regions. One such example is provided above, in connection with describing forming a U-shaped cross-beam member.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A unitary, tubular cross-beam member for use in a twist-axle of a vehicle, the twist-axle being provided with two trailing arms, the cross-beam member extending between and joining the trailing arms at two connection regions of the cross-beam member to form an integral axle, the cross-beam member comprising a central section formed between the two connection regions, the central section being torsionally elastic and each of the connection regions being torsionally stiff adjacent at least a portion of the connection region joining each of the trailing arms, the cross-beam member having a wall thickness that is generally uniform circumferentially and varying longitudinally from the torsionally elastic central section to each of the torsionally stiff connection regions, wherein the wall thickness in at least a portion of the connection regions is smaller than that in the central section.

2. The cross-beam member of claim 1, wherein the wall thickness of the cross-beam member varies smoothly from the torsionally elastic central section to each of the torsionally stiff connection regions.

3. The cross-beam member of claim 1, wherein the central section has a generally open transverse profile to provide the torsional elasticity.

4. The cross-beam member of claim 1, wherein the cross-beam member has two opposite ends and each of the connection regions is formed at one of the ends, and wherein each of the connection regions further comprises an end section formed at each of the opposite ends of the cross-beam member and a transition section formed between the end section and the central section, wherein the end sections are torsionally stiff.

5. The cross-beam member of claim 4, wherein the cross-beam member has a transverse cross-sectional profile, the transverse cross-sectional profile having a general U-shape or V-shape in the central section and transitioning smoothly in the transition section from the general U-shape or V-shape to an end cross-sectional shape in the end sections.

6. The cross-beam member of claim 4, wherein the wall thickness varies in one or more of the central section, the transition sections and the end sections.

7. The cross-beam member of claim 4, wherein the wall thickness is larger in the transition sections than in the central section.

8. The cross-beam member of claim 4, wherein the wall thickness is smaller in the transition sections than in the end sections.

9. The cross-beam member of claim 1, wherein the cross-beam member has a general U-shape and further comprises the two trailing arms each integrally formed with and extending from one of the connection regions in a direction transverse to a longitudinal direction defined by the connection regions.

10. The cross-beam member of claim 9, wherein each said integrated trailing arm has a terminal end, the terminal end being adapted for connecting a wheel thereto.

11. A unitary, tubular cross-beam member for use in a twist-axle of a vehicle, the twist-axle being provided with two trailing arms, the cross-beam member extending between and joining the trailing arms at two connection regions of the cross-beam member to form an integral axle, the cross-beam member comprising a central section formed between the two connection regions, the central section being torsionally elastic and each of the connection regions being torsionally stiff adjacent at least a portion of the connection region joining each of the trailing arms, the cross-beam member having a wall thickness that is generally uniform circumferentially and varying longitudinally from the torsionally elastic central section to each of the torsionally stiff connection regions, wherein the cross-beam member has two opposite ends and each of the connection regions is formed at one of the ends, and wherein each of the connection regions further comprises an end section formed at each of the opposite ends of the cross-beam member and a transition section formed between the end section and the central section, wherein the end sections are torsionally stiff and wherein the wall thickness is smaller in the transition sections than in the central section.

12. The cross-beam member of claim 11, wherein the wall thickness of the cross-beam member varies smoothly from the torsionally elastic central section to each of the torsionally stiff connection regions.

13. The cross-beam member of claim 11, wherein the wall thickness in at least a portion of the connection regions is greater than that in the central section.

14. The cross-beam member of claim 11, wherein the central section has a generally open transverse profile to provide the torsional elasticity.

15. The cross-beam member of claim 11, wherein the cross-beam member has a transverse cross-sectional profile, the transverse cross-sectional profile having a general U-shape or V-shape in the central section and transitioning smoothly in the transition section from the general U-shape or V-shape to an end cross-sectional shape in the end sections.

16. The cross-beam member of claim 11, wherein the wall thickness varies in one or more of the central section, the transition sections and the end sections.

17. The cross-beam member of claim 11, wherein the wall thickness is smaller in the transition sections than in the end sections.

18. The cross-beam member of claim 11, wherein the cross-beam member has a general U-shape and further comprises the two trailing arms each integrally formed with and extending from one of the connection regions in a direction transverse to a longitudinal direction defined by the connection regions.

19. The cross-beam member of claim 18, wherein each said integrated trailing arm has a terminal end, the terminal end being adapted for connecting a wheel thereto.

20. A unitary, tubular cross-beam member for use in a twist-axle of a vehicle, the twist-axle being provided with two trailing arms, the cross-beam member extending between and joining the trailing arms at two connection regions of the cross-beam member to form an integral axle, the cross-beam member comprising a central section formed between the two connection regions, the central section being torsionally elastic and each of the connection regions being torsionally stiff adjacent at least a portion of the connection region joining each of the trailing arms, the cross-beam member having a wall thickness that is generally uniform circumferentially and varying longitudinally from the torsionally elastic central section to each of the torsionally stiff connection regions, wherein the cross-beam member has two opposite ends and each of the connection regions is formed at one of the ends, and wherein each of the connection regions further comprises an end section formed at each of the opposite ends of the cross-beam member and a transition section formed between the end section and the central section, wherein the end sections are torsionally stiff and wherein the wall thickness is larger in the transition sections than in the end sections.

21. The cross-beam member of claim 20, wherein the wall thickness of the cross-beam member varies smoothly from the torsionally elastic central section to each of the torsionally stiff connection regions.

22. The cross-beam member of claim 20, wherein the wall thickness in at least a portion of the connection regions is greater than that in the central section.

23. The cross-beam member of claim 20, wherein the central section has a generally open transverse profile to provide the torsional elasticity.

24. The cross-beam member of claim 20, wherein the cross-beam member has a transverse cross-sectional profile, the transverse cross-sectional profile having a general U-shape or V-shape in the central section and transitioning smoothly in the transition section from the general U-shape or V-shape to an end cross-sectional shape in the end sections.

25. The cross-beam member of claim 20, wherein the wall thickness varies in one or more of the central section, the transition sections and the end sections.

26. The cross-beam member of claim 20, wherein the wall thickness is larger in the transition sections than in the central section.

27. The cross-beam member of claim 20, wherein the cross-beam member has a general U-shape and further comprises the two trailing arms each integrally formed with and extending from one of the connection regions in a direction transverse to a longitudinal direction defined by the connection regions.

28. The cross-beam member of claim 27, wherein each said integrated trailing arm has a terminal end, the terminal end being adapted for connecting a wheel thereto.

* * * * *

UNITED STATES PATENT AND TRADEMARK OFFICE
CERTIFICATE OF CORRECTION

| | | |
|---|---|---|
| PATENT NO. | : 8,490,990 B2 | Page 1 of 1 |
| APPLICATION NO. | : 13/124509 | |
| DATED | : July 23, 2013 | |
| INVENTOR(S) | : Stefano Lepre | |

It is certified that error appears in the above-identified patent and that said Letters Patent is hereby corrected as shown below:

Title page item [30] should be added as follows:

[30]   Foreign Application Priority Data

Nov. 28, 2008   [CA]   Canada   2644464

Signed and Sealed this
First Day of October, 2013

Teresa Stanek Rea
*Deputy Director of the United States Patent and Trademark Office*